United States Patent
O'Brien et al.

[11] 3,910,907
[45] Oct. 7, 1975

[54] PYRAZOLO(1,5-A)-1,3,5-TRIAZINES

[75] Inventors: Darrell E. O'Brien, Mission Viejo; Keitaro Senga, Santa Ana; Thomas Novinson, Newport Beach, all of Calif.

[73] Assignee: ICN Pharmaceuticals, Inc., Irvine, Calif.

[22] Filed: July 9, 1973

[21] Appl. No.: 377,444

[52] U.S. Cl. ........ 260/248 NS; 260/249.5; 424/249; 260/310 R
[51] Int. Cl.² ..................................... C07D 251/72
[58] Field of Search ............... 260/249.5, 248 NS

[56] References Cited
UNITED STATES PATENTS
| | | | |
|---|---|---|---|
| 3,398,148 | 8/1968 | Fry et al. | 260/249.5 |
| 3,846,423 | 11/1974 | Kobe et al. | 260/249.5 |

Primary Examiner—John M. Ford
Attorney, Agent, or Firm—Lyon & Lyon

[57] ABSTRACT

Pyrazolo[1,5-a]-1,3,5-triazines are disclosed which are useful as inhibitors of 3',5'-C-AMP phosphodiesterase. Such triazines have the following structure:

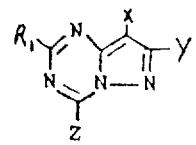

wherein $R_1$, X, Y, and Z are as defined hereinafter. Also disclosed are N-(pyrazol-3-yl) amadines and their free bases, useful in preparing the above triazines and having the following structure:

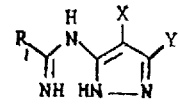

CH₃COOH

| | | | | |
|---|---|---|---|---|
| 07/18/73 | 377444 | 1 | 101 | 65.00CK |
| 07/18/73 | 377444 | 1 | 102 | 100.00CK | wherein $R_1$, X and Y are as defined hereinafter.

43 Claims, No Drawings

PYRAZOLO(1,5-a)-1,3,5-TRIAZINES

BACKGROUND OF THE INVENTION

As reported by Sutherland et al. in *Am. Rev. Biochem*, 37, 149 (1968), cyclic adenosine monophosphate (C-AMP) has been established as an intracellular "second messenger", mediating many of the actions of a variety of different hormones. According to this theory, first messenger hormones, epinephrine and norepinephrine, influence adenyl cyclase contained at or within cell walls to form intracellularly cyclic AMP from adenosine triphosphate upon receipt of the extracellular hormone signal. The formed cyclic AMP in turn functions as a second messenger and stimulates intracellular functions particular to the target cells of the hormone. Cyclic AMP has thus been shown to "activate" protein kinases, which in turn produce physiological effects such as muscle contraction, glycogenolysis, steriodogenisis and lipolysis.

Cyclic AMP is degraded, however, in vivo by phosphodiesterase enzymes, which catalyze hydrolysis of the cyclic purine nucleotide to 5′-adenosine monophosphate with a consequent loss of function. It has accordingly been suggested that substituted cyclic AMP analogs which are more resistant to phosphodiesterase degradation than the naturally occuring cyclic nucleotide might be administered in aid of lagging cellular processes. Synthetic production of such compounds, however, is quite costly. It would be advantageous, therefore, to enhance the beneficial effects of naturally produced cyclic AMP by administering compounds which are capable of inhibiting the undesirable effects of phosphodiesterase enzymes.

Sutherland et al, in *Circulation* 37, 279 (1968), suggest that the pharmocological effects of theophylline, which has the structure:

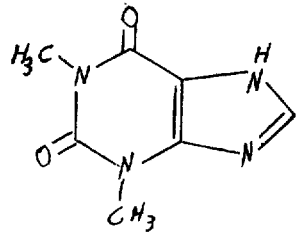

are the result of its ability to inhibit the action of phosphodiesterase enzymes. Theophylline has thus been employed in lieu of the adenyl cyclase-stimulating hormones, epinephrine and norepinephrine, as a heart stimulant following cardiac arrest and in refractory asthma cases as a bronchial dilator. Theophylline, however, does not selectively inhibit phosphodiesterase, but rather gives general stimulation to the central nervous system. Accordingly, the use of theophylline can make the recipient nervous and irritable and can also create cardio vascular effects, i.e., rapid beating. By the same token, theophylline is not as potent a phosphodiesterase inhibitor as is desired and consequently has to be used in larger quantities, which, of course, can further the undesircable effects enumerated above.

As indicated in the application of Darrell E. O'Brien et al., Ser. No. 206,538 entitled "3,5,7-Trisubstituted-pyrazolo [1,5a]pyrimidines", assigned to the same assignee as this application now abandoned in favor of Continuation-In-Part application, Ser. No. 273,465, filed July 20, 1972 which in turn is now abandoned in favor of Continuation-In-Part application, Ser. No. 520,731, filed Nov. 4, 1974, various 5,7-dialkyl-and 5-alkyl- and 5-aralkyl-3,7-disubstitutedpyrazolo[1,5-a]pyrimidines have been found to possess phosphodiesterase inhibition properties. Further investigative effects have led to the discovery that 2-arylpyrazolo[1,5-a]1,3,5-triazines possess significant and selective phosphodiesterase inhibition capability, as set forth in the application of Jose Kobe et al., Ser. No. 232,632, filed Mar. 7, 1972 allowed May 20, 1974, and, assigned to the same assignee as this application.

Those investigative efforts, in turn, led to the synthesis of the pyrazolo[1,5-a]-1,3,5-triazines reported in the application of Joze Kobe et al Ser. No. 260,850, filed June 8, 1972 now U.S. Pat. No. 3,846,423, and assigned to the same assignee as this application. In that application, numerous derivatives of pyrazolo [1,5-a]-1,3,5-triazine were prepared from 7-hydroxy-5-mercaptopyrazolo[1,5-a]-1,3,5-triazine. The starting material was derived from the reaction of 3-aminopyrazole with ethoxy carbonyisothiocyanate via intermediate, N-carbethoxy-N′-(3-pyrazolyl) thiourea or N-carbethoxy-N′-(1-carbethoxythiocarbamoyl-3-pyrazolyl) thiourea. While the work was continuing, some pyrazolo[1,5-a]-1,3,5-triazines were described by L. Capuano, et al., in *Chem. Ber*. 104, 3039 (1971), and were prepared by pro cedures similar to the previous invention.

More recently, other derivatives of pyrazolo[1,5-a]-1,3,5-triazine and its deaza analogue, pyrazolo[1,5-a]pyrimidine were reported to be more potent inhibiters of 3′,5′-cyclic AMP phosphodiesterase than theophylline in rabbit lung and beef heart. (J. Kobe, et al., in 164th ACS National Meeting, New York, NY, Aug. 1972, Abstract MEDI 55; T. Novinson, et al., abstract MEDI 52).

In view of these facts, we have synthesized the pyrazolo[1,5-a]-1,3,5-triazine derivatives of this invention by the reaction of triethyl orthoesters or anhydrides with N-(pyrazol-3-yl) amidines which have not been previously described.

SUMMARY OF THE INVENTION

According to this invention, there are provided phosphodiesterase inhibitors of the general structure;

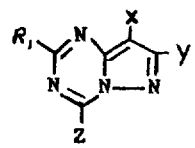

wherein $R_1$ may be $CH_3$, $C_2H_5$ or $C_6H_5$; X may be H, $C_6H_5$, $(m)CH_3$-$C_6H_4$, CN, COOEt, Cl, I or Br; Y may be $C_6H_5$, $(o)CH_3$-$C_6H_4$, $(p)CH_3O$-$C_6H_4$ or H; and Z may be OH, H, $CH_3$, $C_2H_5$, $C_6H_5$, $n$-$C_3H_7$, iso-$C_3H_7$, SH, $SCH_3$, NH($n$-$C_4H_9$) or N($C_2H_5$)$_2$. The invention also includes N-(pyrazol-3-yl) amidines or the free bases thereof used to prepare the above described triazines and having the structure:

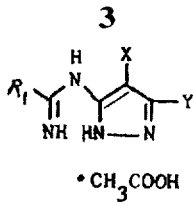

wherein $R_1$ may be $CH_2$ or $C_2H_5$; X may be H, $C_6H_5$, $(m)CH_3$-$C_6H_4$, CN or COOEt; and Y may be $C_6H_5$, $(o)CH_3$-$C_6H_4$, $(p)CH_3O$-$C_6H_4$ or H.

DETAILED DESCRIPTION OF THE INVENTION

The general routes to the compounds of this invention are shown by reaction schemes A–F which follow. Except compounds 22 and 61, the pertinent compounds of this invention are identified by numbers 9 through 65, inclusive.

The reaction of 3-aminopyrazoles with ethylimidates to afford N-(pyrazol-3-yl) amidines as the starting materials for the synthesis of pyrazolo[1,5-a]-1,3,5-triazines is shown in Reaction Scheme A.

Referring now to Reaction Scheme A, the treatment of 3-amino-5-phenylpyrazole (1) (reported by A. Pakamigawa in *Yakugaku Zasski*, 84, 1113 (1964)) with ethyl acetimidate in acetonitrile containg glacial acetic acid under stirring at room temperature gave N-(5-phenylpyrazol-3-yl) amidine acetate (9) in an excellent yield. Analogously the reaction of 3-amino-4-phenyl (4) (reported by E. L. Anderson in *J. Med. Chem.* 1, 259 (1964)) or 3-amino-4-m-toluylpyrazole (5) (reported by E. L. Anderson in *J. Med. Chem.* 1, 259 (1964)) with ethyl acetimadate resulted in the formation of N-(phenylpyrazol-3-yl) acetamidine acetate (12) and N-(4-m-toluylpyrazol-3-yl) acetamidine acetate (13), respectively. Under the same conditions, the treatment of 3-amino-5-O-toluyl (2) (reported by A. Pakamigawa in *Yakugaku Zasski*, 84, 1113 (1964)) and 3-amino-5-α-anisylpyrazole (3) (reported by A. Pakamigawa in *Yakugaku Zasski*, 84, 1113 (1964)) with ethyl acetimidate or ethyl propionimidate afforded oily products of N-(5-substituted pyrazol-3-yl) acetamidine acetate (10, 11, 14, and 15). These compounds were used directly in the synthesis of the related triazines without purification. In an analogous manner, condensation of 3-aminopyrazole (6) (reported by Schmidt et al., In *Helv. Chem. Acta.* 39, 986 (1956)), 3-amino-4-cyanopyrazole (7) (reported by Schmidt et al., in *Helv. Chem. Acta.* 39, 986 (1956)), and 3-amino-4-carbethoxypyrazole (8) (reported by R. K. Robins in *J.A.C.S.*, 78, 788 (1956)) with ethyl acetimidate and ethyl propionimidate afforded additional N-substituted-pyrazole-3-yl amidine derivatives (16, 17, 18, and 19).

When compound 1 was treated with ethyl acetimidate or ethyl propionimidate in acetonitrile without glacial acetic acid under stirring at room temperature, the free bases N-(5-phenylpyrazol-3-yl) acetamidine (20) and N-(5-phenylpyrazol-3-yl) propionamidine (21) were obtained in 68% and 55% yield, respectively. The free compound 20 was converted to the acetate compound 9 by treatment of compound 20 with glacial acetic acid in acetonitrile.

In order to establish the structure of compounds 9 through 21, either compound 6 or 13 may be chosen as a model compound. The structural proof was done by the alternative routes to compound 23 shown in Reaction Scheme B.

REACTION SCHEME A

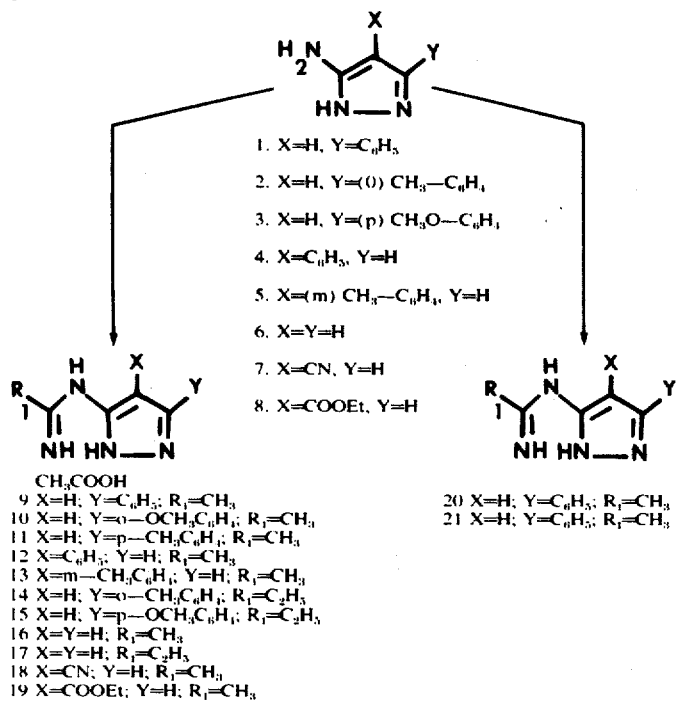

REACTION SCHEME B

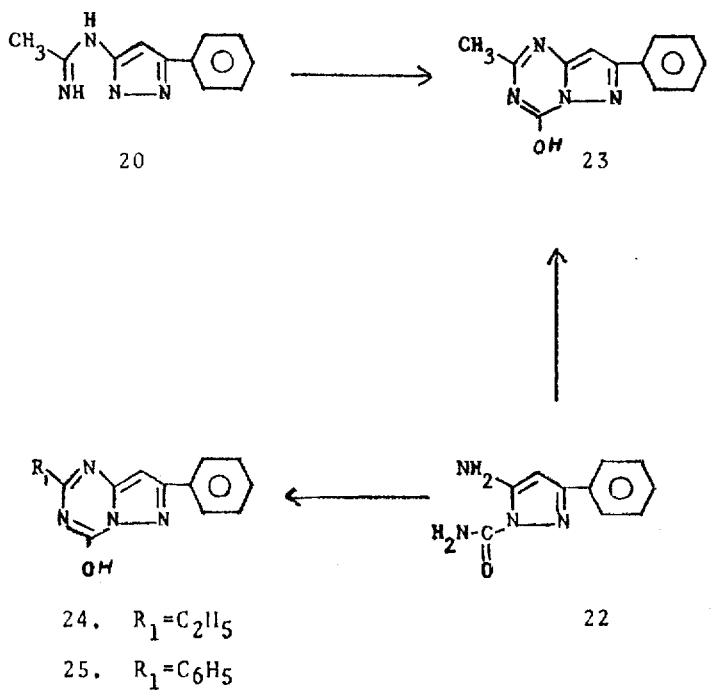

24. $R_1=C_2H_5$
25. $R_1=C_6H_5$

Referring now to Reaction Scheme B, refluxing compound 20 with diethylcarbonate in sodium ethoxide-ethanol solution afforded 7-hydroxy-5-methyl-2-phenylpyrazolo[1,5-a]-1,3,5-triazine (23) in 75% yield. The compound 23 was also obtained in 80% yield by treatment of 5-amino-1-carboxamide-3-phenylpyrazole (22) which is described by S. Cosmann et al., *Gazzette Chem. Ital.*, 82, 373 (1952), with triethyl orthoacetate. The product was identical in all respects to the product produced by the reaction of compound 20 with diethylcarbonate. From these facts, it was clear that the condensation product of compound 1 with ethylacetimidate is N-(5-phenylpyrazol-3-yl) acetamidine (20) or its acetate salt (9). The structure of 6 or 13 was also supported by ir, nmr, uv spectrum and elemental analysis.

By treatment of compound 22 with the appropriate triethyl orthoester 5-ethyl-7-hydroxy-2-phenyl (24) and 7-hydroxy-2,5-diphenylpyrazolo[1,5-a]-1,3,5-triazine (25) were also prepared.

A number of 5,7-substituted pyrazolo [1,5-a]-1,3,5-triazines were synthesized by using the appropriate N-(pyrazol-3-yl) amidines. In preparing these pyrazolo[1,5-a]-1,3,5-triazines, triethyl orthoesters such as triethyl orthoformate, triethyl orthoacetate, triethyl orthopropionate and triethyl orthobenzoate were used as a carbon source at position 7 on the pyrazolo[1,5-a]-1,3,5-triazine ring system. The compounds of this invention prepared by this method are summarized in Reaction Scheme C.

REACTION SCHEME C

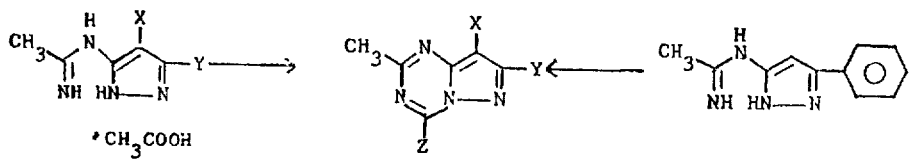

* $CH_3COOH$ 9, 10, 11, 12, 13, 16, 18, 19

26. X=H, Y=$C_6H_5$, Z=H
27. X=H, Y=$C_6H_5$, Z=$CH_3$
28. X=H, Y=$C_6H_5$, Z=$C_2H_5$
29. X=H, Y=$C_6H_5$, Z=$C_6H_5$
30. X=H, Y=(o)$CH_3$-$C_6H_4$, Z=$C_2H_5$
31. X=H, Y=(p)$CH_3$O-$C_6H_4$, Z=$C_2H_5$
32. X=$C_6H_5$, Y=Z=H
33. X=$C_6H_5$, Y=H, Z=$CH_3$
34. X$_{C_6H_5}$, Y=H, Z=$C_2H_5$
35. X=(m)$CH_3$-$C_6H_4$, Y=Z=H
36. X=(m)$CH_3$-$C_6H_4$, Y=H, Z=$CH_3$
37. X=(m)$CH_3$-$C_6H_4$, Y=H, Z=$C_2H_5$
38. X=Y=H, Z=$C_2H_5$
39. X=CN, Y=H, Z=$C_2H_5$
40. X=COOEt, Y=H, Z=$C_2H_5$
41. X=Y=H, Z=$CH_3$

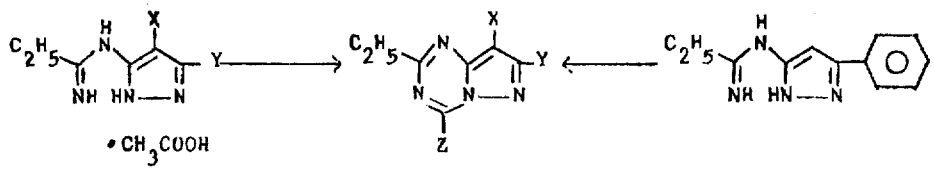

14, 15, 17
42. X=H, Y=C$_6$H$_5$, Z=H
43. X=H, Y=C$_6$H$_5$, Z=CH$_3$
44. X=H, Y=C$_6$H$_5$, Z=C$_2$H$_5$
45. X=H, Y=Z=C$_6$H$_5$
46. X=H, Y=(o)CH$_3$–C$_6$H$_4$, Z=C$_2$H$_5$
47. X=H, Y=(p)CH$_3$O–C$_6$H$_4$, Z=C$_2$H$_5$
48. X=Y=H, Z=CH$_3$

Referring now to Reaction Scheme C, when compound 9 was refluxed with triethyl ortho acetate, 5,7-dimethyl-2-phenylpyrazolo[1,5-a]-1,3,5-triazine (27) was obtained in 83% yield. Alternatively, the reaction of compound 20 with triethyl orthoacetate afforded compound 27 in 72% yield. Analogously, the treatment of the N-(pyrazol-3-yl) amidine acetates (9, 10, 11, 12, 13, 16, 18, and 19) with the appropriate triethyl orthoesters gave the corresponding 5,7 substituted pyrazolo-[1,5-a]-1,3,5-triazines, identified as compounds 26 through 41 in moderate to good yield. Refluxing compound 20 in dimethylformamide also afforded compound 26 in 9.5% yield. Similarly, treatment of compounds 14, 15, 17, and 21 with the appropriate triethyl orthoesters gave the corresponding compounds 42, 43, 44, 46, 47 and 48 Finally, refluxing of compound 14 with benzoic anhydride in dimethylformamide gave 5-ethyl-2,7-diphenylpyrazolo 1,5-a]-1,3,5-triazine (45).

Certain compounds of this invention may be produced by reaction acyl or aryl anhydrides such as acetic, n-butyric, iso-butyric and benzoic anhydride with selected N-(pyrazol3-yl) amidines to convert them into the corresponding pyrazolo [1,5-a]-1,3,5-triazines as shown by Reaction Scheme D.

2-phenylpyrazolo[1,5-a]-1,3,5-triazine (50) and compound 29 were prepared.

The pyrazolo[1,5-a]-1,3,5-triazine ring system undergoes electrophilic attack at position 3. The bromination of various pyrazolo[1,5-a]-1,3,5-triazines is outlined in Reaction Scheme E.

REACTION SCHEME E

26, 27, 28, 49, 29, 43, 44, 38
51. R$_1$=CH$_3$, Z=H, X=Br, Y=C$_6$H$_5$
52. R$_1$=Z=CH$_3$, X=Br, Y=C$_6$H$_5$
53. R$_1$=CH$_3$, Z=C$_2$H$_5$, X=Br, Y=C$_6$H$_5$
54. R$_1$=CH$_3$, Z=n–C$_3$H$_7$, X=Br, Y=C$_6$H$_5$
55. R$_1$=CH$_3$, Z=C$_6$H$_5$, X=Br, Y=C$_6$H$_5$
56. R$_1$=C$_2$H$_5$, Z=CH$_3$, X=Br, Y=C$_6$H$_5$
57. R$_1$=Z=C$_2$H$_5$, X=Br, Y=C$_6$H$_5$
58. R$_1$=CH$_3$, Z=C$_2$H$_5$, X=Br, Y=H
59. R$_1$=CH$_3$, Z=C$_2$H$_5$, X=Cl, Y=H
60. R$_1$=CH$_3$, Z=C$_2$H$_5$, X=I, Y=H

Referring now to Reaction Scheme E, the treatment of compound 26 with an equimolar amount of N-bromosuccinimide in chloroform gave 3-bromo-5-methyl-2-phenylpyrazolo[1,5-a]-1,3,5-triazine (51) in an excellent yield. In accordance with this procedure, several other 3-bromopyrazolo[1,5-a]-1,3,5-triazines (52, 53, 54, 55, 56, 57, and 58) were prepared in good

REACTION SCHEME D

27. Z=CH$_3$
49. Z=n–C$_3$H$_7$
50. Z=iso–C$_3$H$_7$
29. Z=C$_6$H$_5$

Referring now to Reaction Scheme D, refluxing compound 20 with acetic anhydride yielded compound 27 in 45% yield. This product was identical in all respects to that produced by the reaction of compound 9 or compound 20 with triethyl orthoacetate. In a similar manner, 7-n-butyl-5-methyl (49), 7-isobutyl-5-methylyield. Additional electrophilic substitution reactions can be carried out of the compounds of this invention. For example, treatment of 7-ethyl-5-methyl-pyrazolo[1,5-a]-1,3,5-triazine (38) with N-chlorosuccinimide or iodine monochloride afforded 3-chloro or 3-iodo-7-ethyl-5-methyl pyrazolo[1,5-a]-1,3,5-triazine (54 and 60) respectively.

Additional 7-substituted-5-methyl-2-phenylpyrazolo [1,5-a]-1,3,5-triazines were obtained according to Reaction Scheme F.

REACTION SCHEME F

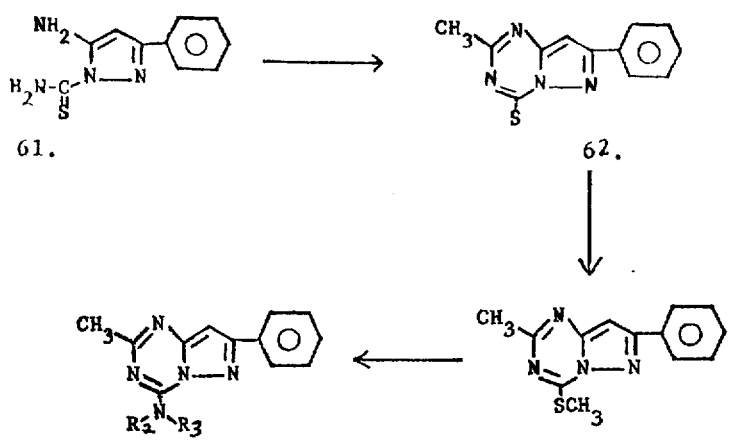

64. $R_2$=H, $R_3$=$n$-$C_4H_9$
65. $R_2$=$R_3$=$C_2H_5$

Referring now to Reaction Scheme F, 7-mercapto-5-methyl-2-phenylpyrazolo[1,5-a]-1,3,5-triazine (62) was first synthesized by the reaction of 5-amino-3-phenyl-1-thiocarbamoylpyrazole (61) which was reported by H. Bayer, et al., in *Chem. Ber.*, 93, 2209 (1960) with triethyl orthoacetate. The mercapto group of compound 62 was alkylated by reacting compound 62 with methyl iodide which affords 5-methyl-7-methylthio-2-phenylpyrazolo[1,5-a]-1,3,5-triazine (63). Nucleophilic displacement of the methylthio moiety of position 7 of compound 63 was next accomplished. Heating of N-butylamine or diethylamine with compound 63 gave 7-n-butylamino-5-methyl-2-phenylpyrazolo [1,5-a]-1,3,5-triazine (64) and 7-diethylamino-5-methyl-2-phenylpyrazolo[1,5-a]-1,3,5-triazine (65), respectively.

The invention is further described and illustrated in the following examples in which all parts and percentages are by weight and all temperatures in degrees Centigrade, unless otherwise indicated. Melting points were taken on a Thomas-Hoover melting point apparatus and are uncorrected. All samples except compounds 10, 11, 14 and 15 were analyzed by the Heterocyclic Chemical Corporation of Harrisonville, Missouri. However, the structure of these four compounds is conclusively established by the analysis of the corresponding triazines which would only result from the reaction of the correct amidine.

EXAMPLE I

N-(5-Phenylpyrazol13-yl) acetamidine acetate (9)

METHOD A

To a mixture of 2.4 g (1.5 mmoles) of 3(5) amino-5(3) phenylpyrazole (1), 1.9 g (2 mmoles) of ethyl acetimidate and 30 ml of acetonitrile, 0.9 g (1.5 mmoles) of glacial acetic acid was added dropwise under stirring at room temperature. After stirring for 1 hr at room temperature, the precipitated crystals were collected by filtrations, washed with acetonitrile and dried to give 3.5 g (90%) of analytically pure N-(5-phenylpyrazol-3-yl) acetamidine acetate (9) that had a melting point of 188°–189°.

Anal. Calcd. for $C_{13}H_{16}N_4O_2$: C, 59.98; H, 6.20; N, 21.53
Found: C, 60.53; H, 640; N, 21.89.

METHOD B

A mixture of 0.4 g (2 mmoles) of N-(5-phenylpyrazol-3-yl) acetamidine (20), 0.12 g (2 mmoles) of glacial acetic acid and 10 ml of acetonitrile was stirred at room temperature for 16 hrs. The separated crystals were collected by filtration, washed with ether to give 0.31 g (60%) of N-(5-phenylpyrazol-3-yl) acetamidine acetate (9) which is identical in all respects to the product by Method A.

EXAMPLE II

N-(5-O-Toluylpyrazol-3-yl) acetamidine acetate (10) and
7-ethyl-5-methyl-2-O-toluylpyrazolo[1,5-a]-1,3,5-triazine (30)

A mixture of 1.73 g (10 mmoles) of 3-amino-5-O-toluylpyrazole (2), 2.0 g of ethyl acetimidate, 2 ml of glacial acetic acid and 100 ml of acetonitrile was stirred at room temperature for 4 hrs. The reaction mixture was evaporated in vacuo to give an oil of N-(5-O-toluylpyrazol-3-yl) acetamidine acetate (10). The product was used without purification in the next step, wherein a mixture of compound 10 with 15 ml of triethyl orthopropionate was refluxed for 16 hrs. The reaction mixture was evaporated in vacuo, and the resulting residue was treated with petroleum ether. The separated crystals were collected and recrystallized from petroleum ether to give 1.68 g (67%) of analytically pure 7-ethyl-5-methyl-2-O-toluylpyrazolo[1,5-a]-1,3,5-triazine (30) that had a melting point of 75°–76°.

Anal. Calcd for $C_{15}H_{16}N_4$: C, 71.40; H, 6.39; N, 22.21 Found: C, 71.28; H, 6.38; N, 22.50.

EXAMPLE III

N-(5-p-Anisylpyrazol-3-yl) acetamidine acetate (11) and 2-O-Anisyl-7-ethyl-5-methyl pyrazolo[1,5-a]-1,3,5-triazine (31)

A mixture of 3.8 g (20 mmoles) of 3-amino-5-p-anisylpyrazole (3), 7.0 g of ethylacetimidate, 10 ml of glacial acetic acid and 50 ml of acetonitrile was stirred at room temperature for 5 hrs. The reaction mixture was evaporated to give an oil of N-(5-p-anisylpyrazol-3-yl) acetamidine acetate (11). The product was used without purification in the next step, wherein a mixture of compound 11 with 15 ml of triethyl orthopropionate was refluxed for 16 hrs. The reaction mixture was evaporated in vacuo and the resulting residue was diluted with petroleum ether. The separated crystals were collected by filtration and recrystallized from petroleum ether to give 3.85 g (72%) of an analytically pure 2-p-anisyl-7-ethyl-5-methylpyrazo [1,5-a]-1,3,5-triazine (31) that had a melting point of 148°–150°.

Anal. Calcd for $C_{15}H_{16}N_4O$: C, 67.14; H, 6.01; N, 20.88 Found: C, 67.31; H, 6.21; N, 21.12.

EXAMPLE IV

N-(4-Phenylpyrazol-3-yl) acetamidine acetate (12)

A mixture of 1.59 g (10 mmoles) of 3-amino-4-phenylpyrazole (4), 2.61 g (30 mmoles) of ethyl acetimidate, 0.6 g (10 mmoles) of glacial acetic acid and 40 ml of acetonitrile was stirred at room temperature for 2 hrs. The precipitated crystals were collected by filtration and washed with acetonitrile and ether to afford 2.35 g (90%) of an analytically pure N-(4-Phenylpyrazol-3-yl) acetamidine acetate (12) that had a melting point of 186°–187°.

Anal. Calcd for $C_{13}H_{16}N_4O_2$: C, 59.97; H, 6.20; N, 21.52 Found: C, 59.62; H, 6.53; N, 21.48.

EXAMPLE V

N-(4-m-Toluylpyrazol-3-yl) acetamidine acetate (13)

A mixture of 1.61 g (10 mmoles) of 3-amino-4-m-toluylpyrazol (5), 2.61 g (mmoles) of ethyl acetimidate, 0.6 g (10 mmoles) of glacial acetic acid and 40 ml of acetonitrile was stirred at room temperature for 3 hrs. The precipitated crystals were collected by filtration and washed with acetonitrile and ether to give 2.2 g (80%) of an analytically pure N-(4-m-toluylpyrazol-3-yl) acetamidine acetate that had a melting point of 150°–151°.

Anal. Calcd for $C_{14}H_{18}N_4O_2$: C, 61.29; H, 6.61; N, 20.43 Found: C, 60.98; H, 6.38; N, 20.35.

EXAMPLE VI

N-(5-O-Toluylpyrazol-3-yl) propionamidine acetate (14) and
5,7-diethyl-2-O-toluylpyrazolo[1,5-a]-1,3,5-triazine (46)

A mixture of 1.73 g (10 mmoles) of compound 2, 5.0 g of ethyl propionimidate, 0.6 g of glacial acetic acid and 20 ml of acetonitrile was stirred at room temperature for 3 hrs. The reaction mixture was evaporated in vacuo, and the resultant oil of N-(5-O-toluylpyrazol-3-yl) propionamidine acetate (14) was used directly in the next step.

A mixture of oil product of compound 14 and 4.2 g of triethyl propionate was refluxed for 5 hrs. The reaction mixture was evaporated in vacuo, and the resulting residue was diluted by petroleum ether. The separated crystals were collected by filtration and recrystallized from a mixture of acetone and petroleum ether to give 0.4 g (15%) of an analytically pure 5,7-diethyl-2-O-toluylpyrazolo[1,5-a]-1,3,5-triazine (46) that had a melting point of 177°–178°.

Anal. Calcd for $C_{16}H_{18}N_4$; C, 72.14; H, 6.81; N, 21.04 Found: C, 71.93; H, 6.64; N, 20.98.

EXAMPLE VII

N-(5-p-Anisylpyrazol-3-yl) propionamidine acetate (15) and
2-p-Anisyl-5,7-diethylpyrazolo[1,5-a]-1,3,5-triazine (47)

A mixture of 1.89 g (10 mmoles) of 3-amino-5-p-anisylpyrazole (3), 3.06 g (30 mmoles) of ethyl propionimidate, 0.6 g (10 mmoles) of glacial acetic acid and 75 ml of acetonitrile was stirred at room temperature for 3 hrs. The reaction mixture was evaporated in vacuo to yield oil of N-(5-p-anisylpyrazol-3-yl) propionamidine acetic (15). The oil product was used directly in the next step wherein compound 15 was refluxed in 10 ml of triethyl orthopropionate for 20 hrs. The reaction mixture was evaporated in vacuo and the resultant residue was diluted with petroleum ether. The separated crystals were recrystallized from petroleum ether to give 1.65 g (59%) of an analytically pure 2-p-anisyl-5,7-diethylpyrazolo[1,5-a]-1,3,5-triazine (47) that had a melting point of 115°–116°.

Anal. Calcd for $C_{16}H_{18}N_4O$: C, 68.06; H, 6.43; N, 19.85. Found: C, 67.93; H, 6.42; N, 19.65.

EXAMPLE VIII

N-(pyrazol-3-yl) acetamidine acetate (16)

A solution of 3-aminopyrazole (6) (21 gm, .25 mole) in acetonitrile (150ml) was treated with ethyl acetimidate (25 gm, .28 mole) and then with acetic acid (15 gm, .25 mole). A mild exothermic reaction took place and the solution became cloudy. After stirring overnight (15 hr.), the white precipitate which had formed was filtered and washed with ether to give 15.4 gm of analytically pure white powder (yield 33%), m.p. 159°–160°.

Anal. Calcd for $C_7H_{12}N_4O_2$: C, 45.65; H, 6.52; N, 30.43. Found: C, 45.80; H, 6.60; N, 30.70.

EXAMPLE IX

N-(pyrazol-3-yl) propionamidine acetate (17)

A solution of 3-aminopyrazole (6) (8.3 gm, 0.10 mole) in dry acetonitrile (100 ml) was treated with ethylpropionimidate (11 gm, 0.105 mole). As the solution was stirred at 25° C, acetic acid (6.0 gm, 0.10 mole) was added dropwise and there was a slight exothermic reaction. The solution became cloudy and was stirred 12 hr. (overnight). Then a few ml of anhydrous ether was added dropwise and the white solid precipitated. The solid was filtered and washed with ether and dried to yield 19 gm (96%) of analytically pure material, m.p. 115°–116°.

Anal. Calcd. for $C_8H_{14}N_4O_2$: C, 48.48; H, 7.07; N, 28.28. Found: C, 48.23; H, 7.16; N, 28.55.

EXAMPLE X

N-(4-cyanopyrazol-3-yl) acetamidine acetate (18)

A suspension of 3-amino-4-cyanopyrazole (7) (10.8 gm, 0.1 mole) in methylene chloride (100 ml) was treated with ethyl acetimidate (9.0 gm, 0.11 mole). The addition of acetic acid (10.0 ml excess over 0.1 mole) caused an exothermic reaction and a solution ensued. Stirring at ambient temperature for 15–20 hour hrs. resulted in the formation of a tan solid which precipitated. Recrystallization of this solid from ethanol-acetone (charcoal) afforded 15 gm (77%) of white needles, m.p. 345° dec.

Anal. Calcd. for $C_8H_{11}N_4O_2$: C, 49.23; H, 5.64; N, 28.71 Found: C, 49.40; H, 5.71; N, 28.53.

IR(KBr) CN band at 2210 cm$^{-1}$.

EXAMPLE XI

N-(4-carbethoxypyrazole-3-yl) acetamidine acetate (19)

A suspension of 3-amino-4-carbethoxypyrazole (8)

(15.5 gm, 0.1 mole) in acetonitrile (50 ml) was treated with ethyl acetimidate (26.0 gm, 0.3 mole) and then glacial acetic acid (6.0 gm, 0.1 mole). An exothermic reaction took place to give a clear solution. Within 30 minutes of stirring at ambient temperature, a cloudy suspension formed. Stirring was continued at room temperature for 15–20 hr (overnight) and the next day the resultant solid (3.6 gm) was filtered. Evaporation of the filtrate gave an oil which was dissolved in acetone and reprecipitated with ethyl ether to yield an additional 5.0 gm. Redissolving the combined solids in acetone and reprecipitation with ether gave 8.2 gm (32%) of analytically pure sample as a white powder, mp. >340° C dec.

Anal. Calcd for $C_{10}H_{16}N_4O_4$ (MW 256.26): C, 46.87; H, 6.29; N, 21.87. Found: C, 47.02; H, 6.35; N, 22.04.

EXAMPLE XII

N-(5-Phenylpyrazol-3-yl) acetamidine (20)

A mixture of 4.8 g (mmoles) of compound 1 and 3.05 g (3.5 mmoles) of ethyl acetimidate in 50 ml of acetonitrile was stirred at room temperature for 64 hrs. The precipitated crystals were collected by filtration, washed with 50 ml of ether and dried to give 2.7 g of colorless crystals. The filtrate was allowed to stand at room temperature for 7 days and precipitated crystals were collected by filtration and washed with ether. 1.35 g of crystals were obtained, bringing the total yield to 4.05 g (68%). Recrystallized from ethanol afforded an analytically pure product that had a melting point of 236°–237°.

Anal. Calcd. for $C_{11}H_{12}N_4$: C, 65.98; H, 6.04; N, 27.98 Found: C, 65.89; H, 5.98; N, 28.00.

EXAMPLE XIII

N-(5-Phenylpyrazol-3-yl) propionamidine (21)

A mixture of 3.18 g (20 mmoles) of compound 1 and 2.52 g (25 mmoles) of ethyl propionimidate in 20 ml of acetonitrile was stirred at room temperature for one hour. The separated crystals were collected by filtration to give 0.15 g of product. The filtrate was consensed to 20 ml in vacuo, and the solution was allowed to stand at room temperature for 16 hrs. The precipitated crystals were collected by filtration, washed with ether and dried to give 2.2 g of analytically pure N-(5-phenylpyrazol-3-yl) propionamidine (21) which had a melting point of 154°–157°. The total yield was 2.35 g (55%).

Anal. Calcd for $C_{12}H_{14}N_4$: C, 67.25; H, 6.59; N, 26.15 Found: C, 67.23; H, 6.74; N, 26.13.

EXAMPLE XIV

7-Hydroxy-5-methyl-2-phenylpyrazolo[1,5-a]-1,3,5-triazone (23)

METHOD A

A mixture of 1 g (5 mmoles) of compound 20 and 5 ml of diethyl carbonate in 30 ml of ethanol containing 1.15 g (50 mg atom) of sodium was refluxed for 2 hrs. After cooling the reaction mixture, the separated crystals were collected by filtration, washed with 10 ml of ethanol and dried. The crystals were suspended in 30 ml of water and then acidified (pH 2) with glacial acetic acid. After standing at room temperature, the crystals were collected by filtration, washed with 10 ml of ethanol and dried to give 1.1 g of colorless crystals. Recrystallization from a mixture of dimethylformamide and ethanol gave 0.85 g (75%) of analytically pure 7-hydroxy-5-methyl-2-phenylpyrazolo[1,5-a]-1,3,5-triazine (23) that had a melting point of 293°–295°.

Anal. Calcd. for $C_{12}H_{10}N_4O$: C, 63.59; H, 4.46; N, 24.76 Found: C, 63.65; H, 4.23; N, 25.02.

METHOD B

A mixture of 1.01 g (5 mmoles) of compound 22 and 15 ml of triethyl orthoacetate was refluxed for 24 hrs. After standing overnight at room temperature, the resulting crystals were collected by filtration, washed with ether and dried to give 0.9 g (80%) of analytically pure 7-hydroxy-5-methyl-2-phenylpyrazolo[1,5-a]-1,3,5-triazine (23) which is identical in all respects to the product by Method A.

EXAMPLE XV

5-Ethyl-7-hydroxy-2-phenylpyrazolo[1,5-a]-1,3,5-triazine (24)

A mixture of 2.02 g (10 mmoles) of compound 22 and 5 ml of triethyl orthopropionate was refluxed for 24 hrs. After standing overnight at room temperature, the precipitated crystals were collected by filtration, washed with ether and dried to afford 1.75 g (73%) of colorless crystals. Recrystallization from dimethylsulfoxide-water gave analytically pure 5-ethyl-7-hydroxy-2-phenylpyrazolo[1,5-a]-1,3,5-triazine (24) that had a melting point of 244°–245°.

Anal. Calcd. for $C_{13}H_{12}N_4O$: C, 64.98; H, 5.03; N, 23.32. Found: C, 64.98; H, 4.99; N, 23.19.

EXAMPLE XVI

7-Hydroxy-2,5-diphenylpyrazolo[1,5-a]-1,3,5-triazine (25)

A mixture of 2.02 g (10 mmoles) of compound 22 and 2.68 g (12 mmoles) of triethylorthobenzoate in 20 ml of dimethylformamide was refluxed for 24 hrs. The reaction mixture was evaporated to dryness in vacuo, and ethanol was added to the resulting residue. The insoluble crystals were collected by filtration, washed with ethanol and dried to give 1.35 g (47%) of product. Recrystallization from a mixture of dimethylformamide and water gave analytically pure 7-hydroxy-2,5-diphenylpyrazolo[1,5-a]-1,3,5-triazine (25) that had a melting point of 297°–300°.

Anal. Calcd. for $C_{17}H_{12}N_4O$: C, 70.82; H, 4.20; N, 19.44 Found: C, 70.75; H, 3.96; N, 19.51.

EXAMPLE XVII

5-Methyl-2-phenylpyrazolo[1,5-a]-1,3,5-triazine (26)

METHOD A

A mixture of 2 g (7.7 mmoles) of compound 9 and 20 ml of triethyl orthoformate was heated under refluxing for 24 hrs. After cooling, the separated crystals were collected by filtration and washed with ether to give 1.1 g (68%) of pale yellow crystals. Recrystallization from benzene gave analytically pure 5-methyl-2-phenylpyrazolo[1,5-a]-1,3,5-triazine (26) that had a melting point of 214°–215°.

Anal. Calcd. for $C_{12}H_{10}N_4$: C, 68.54; H, 4.80; N, 26.65 Found: C, 68.52; H, 4.81; N, 26.61.

METHOD B

A mixture of 1 g (5 mmoles) of compound 20 and 20 ml of dimethylformamide was heated under refluxing for 24 hrs. The reaction mixture was evaporated in vacuo, and the resulted residue was added to ethanol. The resultant insoluble crystals were collected by filtration to give 0.1 g (9.5%) of 5-methyl-2-phenylpyrazolo[1,5-a]-1,3,5-triazine (26) which is identical in all respects to the product by Method A.

EXAMPLE XVIII 5,7-dimethyl-2-phenylpyrazolo[1,5-a]-1,3,5-triazine (27)

METHOD A

A mixture of 3.5 g (13.5 mmoles) of compound 9 and 10 g of triethyl orthoacetate was heated under refluxing for 24 hrs. After cooling the reaction mixture, precipitated crystals were collected by filtration, washed with ether and dried to give 2.5 g (83%) of product. Recrystallization from benzene gave analytically pure 5,7-dimethyl-2-phenylpyrazolo-[1,5-a]-1,3,5-triazine (27) that had a melting point of 164.5°–165°.

Anal. Calcd. for $C_{13}H_{12}N_4$: C, 69.61; H, 5.40; N, 24.99 Found: C, 69.55; H, 5.52; N, 25.19.

METHOD B

A mixture of 5 g (25 mmoles) of compound 20 and 30 ml of triethylorthoacetate was refluxed for 48 hrs. After cooling the reaction mixture, the separated crystals were collected by filtration, washed with ether and dried to give 4 g (72%) of 5,7-dimethyl-2-phenylpyrazolo[1,5-a]-1,3,5-triazine (27) which is identical in all respects to the product by Method A.

METHOD C

A mixture of 1 g (5 mmoles) of compound 27 and 20 ml of acetic anhydride was refluxed for 3 hrs. After standing at room temperature overnight, the precipitated crystals were collected by filtration, washed with ether and dried to give 0.5 g (45%) of 5,7-dimethyl-2-phenylpyrazolo[1,5-a]-1,3,5-triazine (27) which is identical in all respects to the product prepared by Method A.

EXAMPLE XIX

7-Ethyl-5-methyl-2-phenylpyrazolo[1,5-a]-1,3,5-triazine (28)

A mixture of 3 g. (11.5 mmoles) of compound 9 and 10 g of triethyl orthopropionate was refluxed for 16 hrs. The reaction mixture was allowed to stand in an ice box, and the separated crystals were collected by filtration, washed with 20 ml of ether to give 1.85 g (65%) of colorless crystals. Recrystallization from benzene gave analytically pure 7-ethyl-5-methyl-2-phenylpyrozolo[1,5-a]-1,3,5-triazine (28) that had a melting point of 137°–138.5°.

Anal. Calcd. for $C_{14}H_{14}N_4$: C, 70.55; H, 5.93; N, 23.51 Found: C, 70.53; H, 5.93; N, 23.58.

EXAMPLE XX

5-Methyl-2,7-diphenylpyrazolo[1,5-a]-1,3,5-triazine (29)

METHOD A

A mixture of 3 g (15 mmoles) of compound 9 and 4.48 g (20 mmoles) of triethyl orthobenzoate in 20 ml of dimethylformamide was refluxed for 16 hrs. The reaction mixture was evaporated to dryness in vacuo. Ether was added to the resulting residue, and the insoluble crystals were collected by filtration, washed with ether and dried to give 1.95 g (46%) of analytically pure 5-methyl-2,7-diphenylpyrazolo[1,5-a]-1,3,5-triazine (29) that had a melting point of 160°–162°.

Anal. Calcd. for $C_{18}H_{14}N_4$: C, 75.50; H, 4.93; N, 19.57 Found: C, 75.20; H, 4.98; N, 19.78

METHOD B

A mixture of 1 g (5 mmoles) of compound 20 and 2.26 g (10 mmoles) of benzoic anhydride in 20 ml of dimethylformamide was refluxed for 5 hrs. The reaction mixture was evaporated in vacuo. Ether was added to the resulting residue and the insoluble crystals were collected by filtration, washed with ether and dried to give 0.6 g (53%) of 5-methyl-2,7-diphenylpyrazolo[1,5-a]-1,3,5-triazine (29) which is identical in all respects to the product prepared by Method A.

EXAMPLE XXI 5-methyl-3-phenylpyrazolo[1,5,-a]-1,3,5-triazine (32)

A mixture of 2.0 g (7.7 mmoles) of compound 12 and 5 ml of triethyl orthoformate was refluxed for 5 hrs. The reaction mixture was evaporated in vacuo and the resulting residue was washed with ether to afford 0.4 g (25%) of analytically pure 5-methyl-3-phenylpyrazolo[1,5-a]-1,3,5-triazine (32) that had a melting point of 117°–119°.

Anal. Calcd. for $C_{12}H_{10}N_4$: C, 68.54; H, 4.80; N, 26.65 Found: C, 68.60; H, 4.75; N, 26.63.

EXAMPLE XXII 5,7-dimethyl-3-phenylpyrazolo[1,5-a]-1,3,5-triazine (33)

A mixture of 2.0 g (7.7 mmoles) of compound 12 and 15 ml of triethyl orthoacetate was refluxed for 24 hrs. After cooling the reaction mixture, the separated crystals were collected by filtration, washed with ether and dried to afford 1.1 g (64%) of crystals. Recrystallization from a mixture of benzene and petroleum ether gave analytically pure 5,7-dimethyl-3-phenylpyrazolo[1,5-a]-1,3,5-triazine (33) that had a melting point of 143°–144.5°.

Anal. Calcd. for: $C_{13}H_{12}N_4$: C, 69.61; H, 5.40; N, 24.98 Found: C, 69.69; H, 5.49; N, 25.08.

EXAMPLE XXIII 7-ethyl-5-methyl-3-phenylpyrazolo[1,5-a]-1,3,5-triazine (34)

A mixture of 2.5 g (9.6 mmoles) of compound 12 and 8 ml of triethyl orthopropionate was refluxed for 16 hrs. The reaction mixture was stored in an ice box, and the precipitated crystals were collected by filtration, washed with ether and dried to afford 1.8 g (64%) of crystals. Recrystallization from n-heptane afforded analytically pure 7-ethyl-5-methyl-3-phenylpyrazolo [1,5-a]-1,3,5-triazine (34) that had a melting point of 83°–84°.

Anal. Calcd for $C_{14}H_{14}N_4$: C, 70.55; H, 5.93; N, 23.51 Found: C, 70.65; H, 5.84; N, 23.50.

EXAMPLE XXIV 5-methyl-3-m-toluylpyrazolo[1,5-a]-1,3,5-triazine (35)

A mixture of 2.14 g (7.8 mmoles) of compound 13 and 10 ml of triethyl orthoformate was refluxed for 5 hrs. The reaction mixture was evaporated to dryness in vacuo. Petroleum ether was added to the residue and allowed to stand at room temperature. The separated crystals were collected by filtration, washed with ether and dried to give 1.3 g (74%) of analytically pure 5-methyl-3-m-toluylpyrazolo[1,5-a]-1,3,5-triazine (35) that had a melting point of 100°–101°.

Anal. Calcd. for $C_{13}H_{12}N_4$: C, 69.61; H, 5.40; N, 24.98 Found: C, 69.55; H, 5.37; N, 25.20

EXAMPLE XXV 5,7-dimethyl-3-m-toluylpyrazolo[1,5-a]-1,3,5-triazine (36)

A mixture of 2.14 g (7.8 mmoles) of compound 13 and 15 ml of triethyl orthoacetate was refluxed for 24 hrs. After cooling the reaction mixture, the precipitated crystals were collected by filtration, washed with ether and dried to afford 1.4 g (75%) of crystals. Recrystallization from benzenepetroleum ether gave analytically pure 5,7-dimethyl-3-m-toluylpyrazolo[1,5-a]-1,3,5-triazine (36) that had a melting point of 152°–153°.

Anal. Calcd. for $C_{14}H_{14}N_4$: C, 70.55; H, 5.93; N, 23.51 Found: C, 70.68; H, 5.96; N, 23.57

EXAMPLE XXVI 7-ethyl-5-methyl-3-m-toluylpyrazolo[1,5-a]-1,3,5-triazine (37)

A mixture of 2.4 g (8.8 mmoles) of compound 13 and 8 ml of triethyl orthopropionate was refluxed for 16 hrs. The reaction mixture was allowed to stand in an ice box and the precipitated crystals were collected by filtration, washed with ether and dried to give 1.5 g (68%) of crystals. Recrystallization from n-heptane afforded analytically pure 7-ethyl-5-methyl-3-m-toluylpyrazolo[1,5-a]-1,3,5-triazine (37) which had a melting point of 106°–108°.

Anal. Calcd. for $C_{15}H_{16}N_4$: C, 71.38; H, 6.40; N, 22.21 Found: C, 71.41; H, 6.50; N, 22.20.

EXAMPLE XXVII 7-ethyl-5-methylpyrazolo[1,5-a]-1,3,5-triazine (38)

A mixture of N-(pyrazol-3-yl) acetamidine acetate (16) (3.7 gm, 0.02 mol) and triethylorthopropionate (25 ml, excess) was refluxed for 4 hr. The solution was evaporated (rotovac at 45°–70°/2mm) and the resultant solid was recrystallized from petroleum ether (30/60) to yield 1.7 gm (53%) of white needles, m.p. 78°–79° C.

Anal. Calcd. for $C_8H_{10}N_4$: C, 59.25; H, 6.17; N, 34.56 Found: C, 59.27; H, 6.18; N, 34.61.

NMR ($CDCl_3$): $t$, 1.50$\delta$ ($C_7$-ethyl); $s$, 2.70$\delta$ ($C_5$-methyl); $q$, 3.30$\delta$ ($C_7$-ethyl); $d$, 6.47$\delta$ ($C_3$-H); $d$, 8.10$\delta$ ($C_2$-H). $J_{2,3}$ = 2.5 cps.

EXAMPLE XXVIII 3-cyano-7-ethyl-5-methylpyrazolo[1,5-a]-1,3,5-triazine (39)

A mixture of N-(4-cyanopyrazole-3-yl) acetamidine acetate (18) (4.0 gm, 0.022 mole) and triethylorthopropionate (20 ml, excess) was refluxed 72 hr and then cooled. The solution was filtered to remove some insoluble matter and the filtrate was evaporated to yield a solid. Recrystallization of this solid from acetone-hexane (charcoal treatment) afforded 1.75 gm (43%) white needles, m.p. 100°–103°C.

Anal. Calcd. for $C_9H_9N_5$: C, 57.74; H, 4.85; N, 37.41 Found: C, 58.02; H, 4.91; N, 37.16.

IR(KBr) CN band at 2210 $cm^{-1}$

NMR ($d_6$-DMSO): $t$, 1.40$\delta$ ($C_7$-ethyl); $s$, 2.64$\delta$ ($C_5$-methyl); $q$, 4.35$\delta$ ($C_7$-ethyl); $s$, 8.48$\delta$ ($C_2$-H).

EXAMPLE XXIX 3-carbethoxy-7-ethyl-5-methylpyrazolo[1,5-a]-1,3,5-triazine (40)

A mixture of N-(4-carbethoxypyrazol-3-yl) acetamidine acetate (19) (2.56 gm, 0.01 mole) and triethylorthopropionate (20 ml, excess) was refluxed for 5–7 hr. Upon removal of excess solvent (rotovac, 50°/2mm), a solid was obtained which was recrystallized from ethanol to afford 1.3 gm (56%) of a white powder, m.p. 178°–180°C.

Anal. Calcd. for $C_{11}H_{14}N_4O_2$: (MW 234.25): C, 56.40; H, 6.02; N, 23.92 Found: C, 56.55; H, 6.07; N, 24.07.

NMR(DMSO-$d_6$): $t$, 1.58$\delta$ ($C_7$-ethyl); $t$, 1.64$\delta$ ($C_3$-ester ethyl); $s$, 2.75$\delta$ ($C_5$-methyl); $q$, 4.07$\delta$ ($C_7$-ethyl); $q$, 4.45$\delta$ ($C_3$-ester ethyl); $s$, 8.50$\delta$ ($C_2$-H).

EXAMPLE XXX 5,7-dimethalpyrazolo[1,5-a]-1,3,5-triazine (41)

A mixture of N-(pyrazol-3-yl) acetamidine acetate (16) (3.7 gm, 0.02 mol) and triethylorthoacetate (10 ml, excess) was refluxed for 4 hr. The solution was evaporated (rotovac at 45–7-°/2mm) and the resultant solid was recrystallized from petroleum ether (30/60) to yield 2.95 gm (100%) of white needles, m.p. 49°–50°C.

Anal. Calcd. for $C_7H_8N_4$: C, 56.74; H, 5.44; N, 37.81 Found: C, 57.05; H, 5.31; N, 37.92.

NMR ($CDCl_3$): $s$, 2.68 $\delta$ ($C_5$-methyl); $s$, 2.95 $\delta$ ($C_7$-methyl); $d$, 6.49 $\delta$ ($C_3$H); $d$, 8.11 $\delta$ ($C_2$H) $J_{2,3}$ = 2.0 cps

EXAMPLE XXXI 5-ethyl-2-phenylpyrazolo[1,5-a]-1,3,5-triazine (42)

A mixture of 2.14 g (10 mmoles) of compound 21 and 10 ml of triethyl orthoformate was refluxed for 5 hrs. The reaction mixture was evaporated to dryness in vacuo and 1.2 g (54%) of crystals were obtained. Recrystallization from a mixture of n-hexane and chloroform gave analytically pure 5-ethyl-2-phenylpyrazolo[1,5-a]-1,3,5-triazine (42) which had a melting point of 155°–156°.

Anal. Calcd. for $C_{13}H_{12}N_4$: C, 69.61; H, 5.40; N, 24.98 Found: C, 69.55; H, 5.41; N, 25.21.

EXAMPLE XXXII 5-ethyl-7-methyl-2-phenylpyrazolo[1,5-a]-1,3,5-triazine (43)

A mixture of 2.14 g (10 mmoles) of compound 21 and 10 ml of triethyl orthoacetate was refluxed for 2 hrs. After cooling, the precipitated crystals were collected by filtration, washed with ether and dried to give 1.7 g (71%) of colorless crystals. Recrystallization from n-heptane gave analytically pure 5-ethyl-7-methyl-2-phenylpyrazolo[1,5-a]-1,3,5-triazine (43) that had a melting point of 93°–95°C.

Anal. Calcd. for $C_{14}H_{14}N_4$: C, 70.55; H, 5.93; N, 23.51 Found, C, 70.57; H, 6.03; N, 23.59.

EXAMPLE XXXIII 5,7-diethyl-2-phenylpyrazolo[1,5-a]-1,3,5-triazine (44)

A mixture of 3.21 g (15 mmoles) of compound 21 and 8 ml of triethyl orthopropionate was refluxed for 24 hrs. After cooling the reaction mixture, the precipitated crystals were collected by filtration, washed with ether and dried to give 2.7 g (72%) of crystals. Recrystallization from n-heptane gave analytically pure 5,7-diethyl-2-phenylpyrazolo[1,5-a]-1,3,5-triazine (44) that had a melting point of 83°–85°.

Anal. Calcd. for $C_{15}H_{16}N_4$: C, 71.40; H, 6.39; N, 22.21 Found: C, 71.32; H, 6.37; N, 22.31.

EXAMPLE XXXIV 5-ethyl-2,7-diphenylpryzolo[1,5-a]-1,3,5-triazine (45)

A mixture of 4.28 g (20 mmoles) of compound 21 and 4.52 g (20 mmoles) of benzoic anhydride in 20 ml of dimethylformamide was refluxed for 16 hrs. The reaction mixture was evaporated to dryness in vacuo. Ether was added to the resulting residue and the insoluble crystals were collected by filtration, washed with ether and dried to afford 0.3 g of yellow crystals as an analytically pure 5-ethyl-2,7-diphenylpyrazolo[1,5-a]-1,3,5-triazine (45) that had a melting point of 133°–137°.

Anal. Calcd. for $C_{19}H_{16}N_4$: C, 75.96; H, 6.37; N, 18.65 Found: C, 76.00; H, 5.27; N, 18.54.

EXAMPLE XXXV 5-ethyl-7-methylpyrazolo[1,5-a]-1,3,5-triazine (48)

A mixture of N-(pyrazol-3-yl) propionamidine acetate (17) (4.0 gm, 0.02 mole) and triethylorthoacetate (20 ml, excess) was refluxed for 5 hr and then stirred at 25° C for 12 hr. (overnight). Then the solvent was removed (rovovac 45°/2mm) and the oil obtained was dissolved in petroleum ether (30/60) and crystallized by refrigeration for several hours. The yield was 2.2 gm (69%) of white needles, m.p. 58°–59°C.

Anal. Calcd. for $C_8H_{10}N_4$: C, 59.25; H, 6.17; N, 34.56 Found: C, 59.40; H, 6.31; N, 34.71.

NMR ($CDCl_3$): $t$, 1.40δ ($C_5$-ethyl); $s$, 2.95δ ($C_7$-methyl); $q$, 3.00δ ($C_5$-ethyl); $d$, 6.52δ ($C_3$-H); $d$, 8.12δ ($C_2$-H) $J_{2,3}$= 2.5 cps.

EXAMPLE XXXVI 5-methyl-2-phenyl-7-n-propylpyrazolo[1,5-a]-1,3,5-triazine (49)

A mixture of 3.0 g (15 mmoles) of compound 20 and 10 ml of n-butyric anhydride was refluxed for 3 hrs. After standing overnight at room temperature, separated crystals were collected by filtration, washed with ethanol and dried to give 2.75 g (73%) of crystals. Recrystallization from n-hexane gave analytically pure 5-methyl-2-phenyl-7-n-propylpyrazolo[1,5-a]-1,3,5-triazine (49) that had a melting point of 112°–113°.

Anal. Calcd. for $C_{15}H_{16}N_4$: C, 71.40; H, 6.39; N, 22.21
Found: C, 71.52; H, 6.34; N, 22.31.

EXAMPLE XXXVII 5-methyl-2-phenyl-7-iso-propylpyrazolo[1,5-a]-1,3,5-triazine (50)

A mixture of 2.0 g (10 mmoles) of compound 20 and 10 ml of iso-butyric anhydride was refluxed for 5 hrs. The reaction mixture was allowed to stand at room temperature for 7 days. The separated crystals were collected by filtration, washed with ether to give 0.5 g (11%) of an analytically pure 5-methyl-2-phenyl-7-iso-propylpyrazolo[1,5-a]-1,3,5-triazine (50) that had a melting point of 103°–104°.

Anal. Calcd. for $C_{15}H_{16}N_4$: C, 71.40; H, 6.39; N, 22.21 Found: C, 71.52; H, 6.34; N, 22.31.

EXAMPLE XXXVIII

General procedures for the preparation of 5,7-disubstituted-3-bromo-2-phenylpyrazolo[1,5-a]-1,3,5-triazines (51–57)

A mixture of 5–6 mmoles of 5,7-disubstituted-2-phenylpyrazolo[1,5-a]-1,3,5-triazine and the equivalent mole of N-bromosuccinimide in 30 ml of chloroform was refluxed for 10–20 minutes. The resulting solution was stirred at room temperature for 30 minutes. The reaction mixture was washed with saturated aqueous sodium carbonate solution (25 ml × 2) and water (25 ml × 1). The chloroform solution was dried over sodium sulfate and then evaporated to dryness in vacuo to afford product. Recrystallization from an appropriate solvent gave analytically pure 5,7-disubstituted-3-bromo-2-phenylpyrazolo[1,5-a]-1,3,5-triazine.

Solvent of recrystallization, yield, melting point, empirical formula and elemental analysis of 5,7-disubstituted-3-bromo-2-phenylpyrazolo[1,5-a]-1,3,5-triazines compounds are listed in the following Table I.

TABLE I

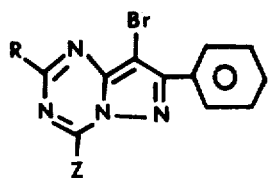

| No. | R1 | Z | Recrystallization Solvent | Yield % | Mp °C | Empirical Formula | Calcd C | H | N | Found C | H | N |
|---|---|---|---|---|---|---|---|---|---|---|---|---|
| 51 | $CH_3$ | H | Benzene-pet. ether | 84 | 155–157 | $C_{12}H_9N_4Br$ | 49.83 | 3.14 | 19.37 | 49.76 | 3.12 | 19.37 |
| 52 | $CH_3$ | $CH_3$ | n-Heptane | 100 | 136–138 | $C_{13}H_{11}N_4Br$ | 51.49 | 3.66 | 18.48 | 51.48 | 3.67 | 18.29 |
| 53 | $CH_3$ | $C_2H_5$ | n-Hexane | 88 | 123.5–125 | $C_{14}H_{13}N_4Br$ | 53.00 | 4.13 | 17.66 | 53.00 | 4.11 | 17.75 |
| 54 | $CH_3$ | n—$C_3H_7$ | n-Hexane | 35 | 110–112 | $C_{15}H_{15}N_4Br$ | 54.38 | 4.57 | 16.91 | 54.52 | 4.79 | 16.93 |
| 55 | $CH_3$ | $C_6H_5$ | n-Hexane-chloroform | 95 | 152–154 | $C_{18}H_{13}N_4Br$ | 59.18 | 3.59 | 15.34 | 58.98 | 3.55 | 15.44 |
| 56 | $C_2H_5$ | $CH_3$ | n-Heptane | 69 | 94–95 | $C_{14}H_{13}N_4Br$ | 53.00 | 4.13 | 17.66 | 53.00 | 4.11 | 17.75 |
| 57 | $C_2H_5$ | $C_2H_5$ | n-Heptane | 93 | 85–87 | $C_{15}H_{15}N_4Br$ | 54.38 | 4.57 | 16.91 | 54.49 | 4.57 | 16.82 |

EXAMPLE XXXIX 3-bromo-7-ethyl-5-methylpyrazolo[1,5-a]-1,3,5-triazine (58)

A mixture of 7-ethyl-5-methylpyrazolo[1,5-a]-1,3,5-triazine (38) (2.0 gm, 0.0123 mole) and N-bromosuccinimide (2.6 gm, 0.015 mole) in 50 ml chloroform was refluxed 15 minutes, then poured onto 20 gm ice and the chloroform soluiton was separated (sep funnel) and washed with 2 × 50 ml portions of 10% sodium carbonate solution. The organic phase was dried ($Na_2SO_4$) and upon evaporation, the solid obtained was recrystallized from ether-hexane to afford 1.2 gm (41%) of ivory white needles, m.p. 87°–88°C.

Anal. Calcd. for $C_8H_9N_4Br$: C, 39.83; H, 3.73; N, 23.23 Found: C, 40.12; H, 3.90; N, 23.50.

NMR ($CDCl_3$): $t$, 1.48$\delta$ ($C_7$-ethyl); $s$, 2.73$\delta$ ($C_5$-methyl); $q$, 3.30$\delta$ ($C_7$-ethyl); $s$, 8.10$\delta$ ($C_2$-H).

EXAMPLE XL 3-chloro-7-ethyl-5-methylpyrazolo[1,5-a]-1,3,5-triazine (59)

A mixture of 7-ethyl-5-methylpyrazolo[1,5-]-1,3,5-triazine (38) (2.0 gm, 0.0123 mole), 1.8 gm N-chlorosuccinimide (1.8 gm) and 50 ml chloroform was refluxed for 15 minutes. The cooled solution was washed with 2 × 50 ml portions of cold 10% sodium carbonate solution and the organic phase was dried ($Na_2SO_4$) and evaporated to give a solid. Recrystallization of this solid from ether-hexane yielded 800 mg (33%) of yellowish needles, m.p. 62°–63°C.

Anal. Calcd. for $C_8H_9N_4Cl$: c, 48.85; H, 4.58; N, 28.49 Found: C, 49.13; H, 4.70; N, 28.67.

NMR ($CDCl_3$): $t$, 1.50$\delta$ ($C_7$-ethyl); $s$, 2.70$\delta$ ($C_5$-methyl); $q$, 3.33$\delta$ ($C_7$-ethyl); $s$, 8.10$\delta$ ($C_2$-H)

EXAMPLE XLI 7-ethyl-3-iodo-5-methylpyrazolo[1,5-a]-1,3,5-triazine (60)

A mixture of 7-ethyl-5-methylpyrazolo[1,5-a]-1,3,5-triazine (38) (2.0 gm, 0.0123 mole) iodine monochloride (2.2 gm, 0.0135 mole) chloroform (50 ml) was refluxed for 20 minutes. The mixture was allowed to stand for 12 hr. (overnight) and was then poured over 50 gm ice and made alkaline with cold 10% sodium hydroxide solution (pH 8). The chloroform phase was separated and dried ($Na_2SO_4$), then evaporated (rotovac) to yield a brown oil which was taken up in ether and precipitated as a brown powder with petroleum ether (30/60). This solid was dissolved in the minimum volume of chloroform and chromatographed on silica gel with chloromethylacetate (1:1) to yield 700 mg (20%) of a yellow powder, m.p. 90°–92°Dec.

Anal. Calcd. for $C_8H_8N_4I$: C, 33.44; H, 2.78; N, 19.51; Found: C, 33.70; H, 2.81; N, 19.83.

EXAMPLE XLII 7-mercapto-5-methyl-2-phenylpyrazolo[1,5-a]-1,3,5-triazine (62)

A mixture of 4.36 g (20 mmoles) of 5-amino-3-phenyl-1-thiocarbamoylpyrazole (61) and 20 ml of triethyl orthoacetate was refluxed for 4 hrs. After cooling the reaction mixture, the crystals were collected by filtration, washed with ether and dried to give 2.45 g (50%) of product. Recrystallization from dimethylformamide afforded an analytically pure 7-mercapto-5-methyl-2-phenylpyrazolo[1,5-a]-1,3,5-triazine (62) that had a melting point of 313°–315°C.

Anal. Calcd. for $C_{12}H_{10}N_4S$: C, 59.47; H, 4.16; N, 23.12 Found: C, 59.29; H, 4.35; N, 23.09.

EXAMPLE XLIII 5-methyl-7-methylthio-2-phenylpyrazolo[1,5-a]-1,3,5-triazine (63)

To a mixture of 3.63 g (15 mmoles) of compound 62, 0.8 g (20 mmoles) of sodium hydroxide, 10 ml of water and 30 ml of ethanol, 2.13 g (15 mmoles) of methyl iodide was added dropwise under stirring at room temperature. After stirring at the same temperature for 1 hr, the crystals were collected by filtration, washed with water and dried to give 2.9 g (60%) of product. Recrystallization from ethanol gave an analytically pure 5-methyl-7-methylthio-2-phenylpyrazolo[1,5-a]-1,3,5-triazine (63) that had a melting point of 150°–160°.

Anal. Calcd. for $C_{13}H_{12}N_4S$: C, 60.90; H, 4.73; N, 21.86 Found: C, 61.13; H, 4.92; N, 21.97

EXAMPLE XLIV 7-n-butylamino-5-methyl-2-phenylpyrazolo[1,5-a]-1,3,5-triazine (64)

A mixture of 0.89 g (3.5 mmoles) of compound 63, 0.26 g (3.5 mmoles) of n-butylamine and 20 ml of absolute ethanol was refluxed for 4 hrs. The reaction mixture was evaporated to dryness in vacuo, and the resulting residue was recrystallized from n-hexane to afford 0.75 g (76%) of analytically pure 7-n-butyamino-5-methyl-2-phenylpyrazolo[1,5-a]-1,3,5-triazine (64) that had a melting point of 115°–116°.

Anal. Calcd. for $C_{16}H_{19}N_5$: C, 68.28; H, 6.81; N, 24.91 Found: C, 68.10; H, 6.66; N, 25.08.

EXAMPLE XLV 7-diethylamino-5-methyl-2-phenylpyrazolo[1,5-a]-1,3,5-triazine (65)

A mixture of 2.05 g (8 mmoles) of compound 63 and 15 ml of diethylamine was heated under refluxing for 24 hrs. The reaction mixture was evaporated to dryness in vacuo, and the resulting residue was recrystallized from n-hexane to yield 1.5 g (65%) of analytically pure 7-diethylamino-5-methyl-2-phenylpyrazolo[1,5-a]-1,3,5-triazine (65) that had a melting point of 122°–123°.

Anal. Calcd. for $C_{16}H_{19}N_5$: C, 68.28; H, 6.81; N, 24.91 Found: C, 68.12; H, 6.76; N, 25.19.

EXAMPLE XLVI

The compounds of this invention have been tested for their ability to inhibit action of the enzyme phosphodiesterase. The results of these tests are shown in Table II which follows.

3', 5'-cyclic AMP phosphodiesterase (PDE) has been isolated and purified from three different tissues in the following manner. Homogenates of beef heart, rabbit lung and bovine brain were made in sucrose-Tris-magnesium buffer and were subjected to centrifugation at low speed to remove nuclei and cell debris. The supernatants were then centrifuged at 105,000× g for 30 minutes. The 105,000× g supernatants were then fractionated using $(NH_4)_2SO_4$. The precipitation which formed at 0–30% saturation was collected by centrifugation at 20,000× g, dissolved in Tris-magnesium buffer and dialyzed overnight against the same buffer. A second $(NH_4)_2SO_4$ fraction was obtained by raising the concentration of the first supernant to 50%. These two $(NH_4)_2SO_4$ fractions as well as the supernant from the 30-50% cut were then assayed for PDE activity using the method of Appleman, *Biochemistry*, 10, 311 (1971). The first fraction obtained from heart and lung tissues was found to contain a PDE with low affinity for 3', 5'-cyclic AMP (high Km). The second fraction was found to exhibit a biphasic curve when the Lineweaver-Burk method of analysis was used. This indicates either the presence of two separate enzymes, one having a high and the other a low affinity for the enzymes, or one protein with two separate sites. Appleman, supra, indicates that extracts of brain yield two separate enzymes (a high Km and a low Km) which can be separated by sepharose gel chromatography.

All of the inhibitory studies reported here were performed with the high affinity (Fraction II, low Km) enzyme obtained from beef heart, rabbit lung, and bovine brain. $I_{50}$ values were calculated in some instances from a plot of log I vs. percent I in experiments in which inhibitor concentration was varied over a wide range, at a constant 3', 5'-cyclic AMP concentration of approximately $1.7 \times 10^{-7}$ M. The relative inhibitory activity of each compound as compared with theophylline is expressed as an $\alpha$ value. This value is obtained by dividing the $I_{50}$ value for theophylline in a particular experiment by the $I_{50}$ value obtained for the particular compound being evaluated. In most instances $\alpha$ values were calculated from an inhibition study performed with a single concentration of test compound as long as the inhibition produced by that concentration was from 20–80%. In this instance an $\alpha$ value was calculated by dividing the Concentration of theophylline giving the same (X%) inhibition by the Concentration of test substance giving (X%) inhibition. The validity this method has been checked by comparing values obtained by (1) measurements at a single concentration of inhibitor and (2) measurements at four concentrations of inhibitor ($I_{50}$ determinations). $\alpha$ values compared in this way have been found to agree to within 10% of each other.

The basic incubation mixture contained the following substances (amounts in moles): $^3$H-GAMP (specific activity ~2,180 cmp/pmole), .00016; Tris pH 7.5, 40; $MgCl_2$, 0.5; Enzyme (CAMP phosphodiesterase), 5–50 µg protein; and $10^{-4}$ to $10^{-6}$ molar concentration of the inhibitor; incubation time 10 minutes at 30°C. At the end of incubation the mixtures are heated to 90°C for 2 minutes and 100 µg of snake venom phosphodiesterase from Crotalus atrox was added and the tubes incubated for 10 minutes at 30°C. The mixture was then cooled and 1 ml of a Dowex 1-2X, 200–400 mesh suspension, prepared by mixing 100 g of the resin in 200 g $H_2O$, was added and the mixture centrifuged. An aliquot of the supernant was used to determine counts per minute using a liquid scintillation spectrometer. Zero time values were obtained using incubations in which the CAMP phosphodiesterase was omitted from the first incubation.

TABLE II

| Compound | R₁ | Z | Y | X | αLung | αHeart | αBrain |
|---|---|---|---|---|---|---|---|
| 41 | CH₃ | CH₃ | H | H | 1.0 | 0.9 | — |
| 38 | CH₃ | C₂H₅ | H | H | 1.1 | 0.7 | — |
| 58 | CH₃ | C₂H₅ | H | Br | 2.5 | 1.0 | — |
| 59 | CH₃ | C₂H₅ | H | Cl | 1.8 | 0.8 | — |
| 48 | C₂H₅ | CH₃ | H | H | 2.4 | 0.5 | — |
| 40 | CH₃ | C₂H₅ | H | COOEt | 0.7 | 1.2 | — |
| 39 | CH₃ | C₂H₅ | H | CN | 1.2 | 1.7 | — |
| 60 | CH₃ | C₂H₅ | H | I | 1.3 | 1.4 | — |
| 27 | CH₃ | CH₃ | C₆H₅ | H | 22.0 | 3.5 | 19.0 |
| 26 | CH₃ | H | C₆H₅ | H | 25.0 | 3.0 | 49.0 |
| 52 | CH₃ | CH₃ | C₆H₅ | Br | 40.0 | 3.0 | — |
| 33 | CH₃ | CH₃ | H | C₆H₅ | 25.0 | 3.0 | 49.0 |
| 34 | CH₃ | C₂H₅ | H | C₆H₅ | 27.0 | 10.0 | 39.0 |
| 43 | C₂H₅ | CH₃ | C₆H₅ | H | 12.0 | 2.7 | — |
| 44 | C₂H₅ | C₂H₅ | C₆H₅ | H | 20.0 | 7.0 | 12.0 |
| 56 | C₂H₅ | CH₃ | C₆H₅ | Br | 0.5 | 2.5 | — |
| 42 | C₂H₅ | H | C₆H₅ | H | 14.0 | 0.5 | 97.0 |
| 30 | CH₃ | C₂H₅ | oCH₃—C₆H₄ | H | 15.0 | 16.0 | 42.0 |
| 35 | CH₃ | H | H | mCH₃—C₆H₄ | 1.5 | 0.4 | — |
| 51 | CH₃ | H | C₆H₅ | Br | 1.8 | 0.9 | — |
| 23 | CH₃ | OH | C₆H₅ | H | 1.9 | 0.5 | — |
| 64 | CH₃ | NH(n—C₄H₉) | C₆H₅ | H | 11.0 | 1.7 | — |

Analysis of the results shown in Table 2 indicates that several of the compounds of this invention possess inhibition capability significantly superior to theophylline. Moreover, these results clearly indicate that such compounds possess selective phosphodiesterase enzyme inhibitory capability. With respect to the compounds not listed in Table II due to similarity in structure to the tested compounds, it is expected that in vivo testing of such compounds will confirm phosphodiesterase enzyme inhibitory capability.

I claim:
1. A compound of the structure:

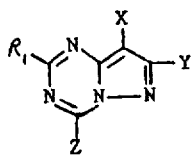

wherein $R_1$ may be $CH_3$, $C_2H_5$ or $C_6H_5$; X may be H, $C_6H_5$, (m)$CH_3$-$C_6H_4$, CN, COOEt, Cl, I or Br; Y may be $C_6H_5$, (o)$CH_3$-$C_6H_4$, (p) $CH_3O$-$C_6H_4$ or H; and Z may be OH, H, $CH_3$, $C_2H_5$, $C_6H_5$, n-$C_3H_7$, iso-$C_3H_7$, SH, $SCH_3$, NH(n-$C_4H_9$) or N($C_2H_5$)$_2$.

2. The compound of claim 1 wherein $R_1$ is $CH_3$, X is H Y is $C_6H_5$, and Z is OH.
3. The compound of claim 2 wherein $R_1$ is $C_2H_5$.
4. The compound of claim 2 wherein $R_1$ is $C_6H_5$.
5. The compound of claim 2 wherein Z is H.
6. The compound of claim 2 wherein Z is $CH_3$.
7. The compound of claim 2 wherein Z is $C_2H_5$.
8. The compound of claim 2 wherein Z is $C_6H_5$.
9. The compound of claim 2 wherein Y is (o)$CH_3$-$C_6H_4$ and Z is $C_2H_5$.
10. The compound of claim 9 wherein Y is (p)$CH_3O$-$C_6H_4$.
11. The compound of claim 2 wherein X is $C_6H_5$ and Y and Z are H.
12. The compound of claim 11 wherein Z is $CH_3$.
13. The compound of claim 11 wherein Z is $C_2H_5$.
14. The compound of claim 11 wherein X is (m)$CH_3$-$C_6H_4$.
15. The compound of claim 14 wherein Z is $CH_3$.
16. The compound of claim 14 wherein Z is $C_2H_5$.
17. The compound of claim 13 wherein X is H
18. The compound of claim 13 wherein X is CN.
19. The compound of claim 13 wherein X is COOEt.
20. The compound of claim 2 wherein X and Y are H and Z is $CH_3$.
21. The compound of claim 1 wherein $R_1$ is $C_2H_5$, X is H, Y is $C_6H_5$, and Z is H.
22. The compound of claim 21 wherein Z is $CH_3$.
23. The compound of claim 21 wherein Z is $C_2H_5$.
24. The compound of claim 21 wherein Z is $C_6H_5$.
25. The compound of claim 23 wherein Y is (o)$CH_3$-$C_6H_4$.
26. The compound of claim 23 wherein Y is (p)$CH_3O$-$C_6H_4$.
27. The compound of claim 22 wherein Y is H.
28. The compound of claim 2 wherein Z is n-$C_3H_7$.
29. The compound of claim 2 wherein C is iso-$C_3H_7$.
30. The compound of claim 1 wherein $R_1$ is $CH_3$, X is Br, Y is $C_6H_5$ and Z is H.
31. The compound of claim 30 wherein Z is $CH_3$.
32. The compound of claim 30 wherein Z is $C_2H_5$.
33. The compound of claim 30 wherein Z is n-$C_3H_7$.
34. The compound of claim 30 wherein Z is $C_6H_5$.
35. The compound of claim 30 wherein $R_1$ is $C_2H_5$ and Z is $CH_3$.
36. The compound of claim 30 wherein $R_1$ and Z are $C_2H_5$.
37. The compound of claim 30 wherein Y is H and Z is $C_2H_5$.
38. The compound of claim 37 wherein X is Cl.
39. The compound of claim 37 wherein X is I.
40. The compound of claim 2 wherein Z is SH.
41. The compound of claim 2 wherein Z is $SCH_3$.
42. The compound of claim 2 wherein Z is NH(n-$C_4H_9$).
43. The compound of claim 2 wherein Z is N($C_2H_5$)$_2$.

* * * * *